United States Patent
Patro et al.

(10) Patent No.: US 9,445,221 B2
(45) Date of Patent: Sep. 13, 2016

(54) METHOD AND SYSTEM FOR SWITCHING COORDINATOR IN A PERSONAL AREA NETWORK

(71) Applicant: Samsung Electronics Co., Ltd., Suwon-si, Gyeonggi-do (KR)

(72) Inventors: Ranjeet Kumar Patro, Bangalore (IN); Thenmozhi Arunan, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/374,072

(22) PCT Filed: Jan. 23, 2013

(86) PCT No.: PCT/KR2013/000542
§ 371 (c)(1),
(2) Date: Jul. 23, 2014

(87) PCT Pub. No.: WO2013/111965
PCT Pub. Date: Aug. 1, 2013

(65) Prior Publication Data
US 2015/0038083 A1 Feb. 5, 2015

(30) Foreign Application Priority Data

Jan. 23, 2012 (IN) .............................. 284/CHE/2012
Jan. 18, 2013 (IN) .............................. 284/CHE/2012

(51) Int. Cl.
*H04W 4/00* (2009.01)
*H04W 84/20* (2009.01)
*H04W 36/08* (2009.01)

(52) U.S. Cl.
CPC ............. *H04W 4/008* (2013.01); *H04W 36/08* (2013.01); *H04W 84/20* (2013.01)

(58) Field of Classification Search
CPC ...................................................... H04W 4/008
USPC ......... 455/41.2, 41.3, 435.1–435.3, 437–439
See application file for complete search history.

(56) References Cited

U.S. PATENT DOCUMENTS 7,447,178 B2   11/2008   Kim et al.
8,238,308 B2 *  8/2012   Jeon et al. .................... 370/331
(Continued)

FOREIGN PATENT DOCUMENTS

WO    2008/026874 A2   3/2008
WO    2008/026874 A3   3/2008
WO    2008/032976 A1   3/2008

OTHER PUBLICATIONS

Thafer H. Sulaiman, Kumarendra Sivarajah, and Hamed S. Al-Raweshidy, "Improved PNC Selection criteria and Process for IEEE802.15.3 [Ad Hoc and Sensor Networks]", IEEE Communications Magazine, Dec. 2007, pp. 102-109.

*Primary Examiner* — Tuan H Nguyen
(74) *Attorney, Agent, or Firm* — Jefferson IP Law, LLP (57) ABSTRACT

A method, an apparatus, and a system for switching coordinators in a Personal Area Network (PAN) are provided. The method includes initiating a request for switching at least one device present in a network session to a first priority PAN coordinator, the initiated request including a count of the at least one device, transmitting the initiated request to the first priority PAN coordinator, the initiated request including a requirement for supporting the at least one device of that count, determining whether the first priority PAN coordinator is capable of supporting the at least one device, and switching, when the first priority PAN coordinator is capable of supporting the at least one device, the network session of the at least one device with the first priority PAN coordinator to facilitate establishment of the network session with the first priority PAN coordinator.

14 Claims, 11 Drawing Sheets

(56) References Cited

U.S. PATENT DOCUMENTS

| | | | |
|---|---|---|---|
| 8,451,815 B2 * | 5/2013 | Driesen et al. | 370/338 |
| 2004/0255001 A1 * | 12/2004 | Oh | H04W 56/0015 709/209 |
| 2009/0081952 A1 | 3/2009 | Lee et al. | |
| 2009/0135772 A1 | 5/2009 | Kwon et al. | |
| 2010/0329212 A1 | 12/2010 | Jeon et al. | |
| 2011/0007727 A1 | 1/2011 | Driesen et al. | |
| 2012/0271902 A1 * | 10/2012 | Baliga | H04L 43/0811 709/209 |

\* cited by examiner

METHOD AND SYSTEM FOR SWITCHING COORDINATOR IN A PERSONAL AREA NETWORK

CROSS-REFERENCE TO RELATED APPLICATION(S)

This application is a U.S. National Stage application under 35 U.S.C. §371 of an International application filed on Jan. 23, 2013 and assigned application number PCT/KR2013/000542, which claimed the benefit of an Indian patent application filed on Jan. 23, 2012 in the Indian Patent Office and assigned Serial number 284/CHE/2012 and an Indian patent application filed on Jan. 18, 2013 in the Indian Patent Office and assigned Serial number 284/CHE/2012, the entire disclosure of each of which is hereby incorporated by reference.

TECHNICAL FIELD

The present disclosure relates to method, apparatus and system for switching coordinator in a Personal Area Network (PAN). More particularly, the present disclosure relates to method, apparatus and system for switching coordinators based on certain conditions in a Wireless Personal Area Network (WPAN).

BACKGROUND

Wireless Personal Area Networks (WPANs) find application in number of real time situations. For example, WPANs are used in hospitals, transportation and logistics and the like to enable individual devices to interact with each other in a network zone. In such situations, the individual devices are connected to each other within the zone to facilitate certain types of communication, including data, and short message transfer. In order to manage and coordinate communication between the devices, at least one PAN coordinator may be used.

IEEE 802.15.4 standard comprises networking protocols for WPANs, coordinators, and devices that are connected. For example, in a hospital environment, there may be at least one wireless sensory device attached to the body of a patient. The sensory devices are configured to monitor multiple parameters. The sensory devices communicate with the PAN coordinators through wireless means, for example, to report collected parameters. During such situations, if the patient is shifted or relocated within the hospital premises with the attached sensory devices, suitable operations need to be performed to facilitate such a transition with appropriate power consumption. Conventional methods appear to be power consuming during the transition.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for switching coordinator in a Personal Area Network (PAN).

In an aspect of the present disclosure, a method of switching Personal Area Network (PAN) coordinators is provided. The method includes the steps of initiating a request for switching at least one device present in a network session to a first priority PAN coordinator, the request including a count of the at least one device, transmitting the initiated request including a requirement for supporting the at least one device of that count, the initiated request is transmitted to the first priority PAN coordinator, determining whether the first priority PAN coordinator is capable of supporting the at least one device, and switching, when whether the first priority PAN coordinator is capable of supporting the at least one device, the network session of the at least one device with the first priority PAN coordinator to facilitate establishment of the network session with the first priority PAN coordinator.

In another aspect of the present disclosure, an apparatus for switching Personal Area Network (PAN) coordinator in a network with at least one device is provided. The apparatus includes a processor, a memory connected to the processor, configured with at least one program to perform a set of predefined instructions the at least one program executed by the processor, the at least one program including a coordinator switching module configured for initiating a request for switching the at least one device present in a network session to a first priority PAN coordinator, the initiated request including a count of the at least one device at least, transmitting the initiated request including a requirement for supporting the at least one device of that count, the initiated request is transmitted to the first priority PAN coordinator, determining whether the first priority PAN coordinator is capable of supporting the at least one device, and switching, when the first priority PAN coordinator is capable of supporting the at least one device, the network session of the at least one device with the first priority PAN coordinator to facilitate establishment of the network session with the first priority PAN coordinator.

In yet another aspect of the present disclosure, a system is provided. The system includes at least one device at least, and a Personal Area Network (PAN) coordinator configured to manage communication of the at least one device, the PAN coordinator comprises a memory and a processor, the memory includes a coordinator switching module configured to perform the steps of initiating a request for switching the at least one device present in a network session to a first priority PAN coordinator, the initiated request including a count of the at least one device, transmitting the initiated request including a requirement for supporting the at least one device of that count, the initiated request is transmitted to the first priority PAN coordinator, determining whether the first priority PAN coordinator is capable of supporting the at least one device, and switching, when the first priority PAN coordinator is capable of supporting the at least one device, the network session of the at least one device with the first priority PAN coordinator to facilitate establishment of the network session with the first priority PAN coordinator.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
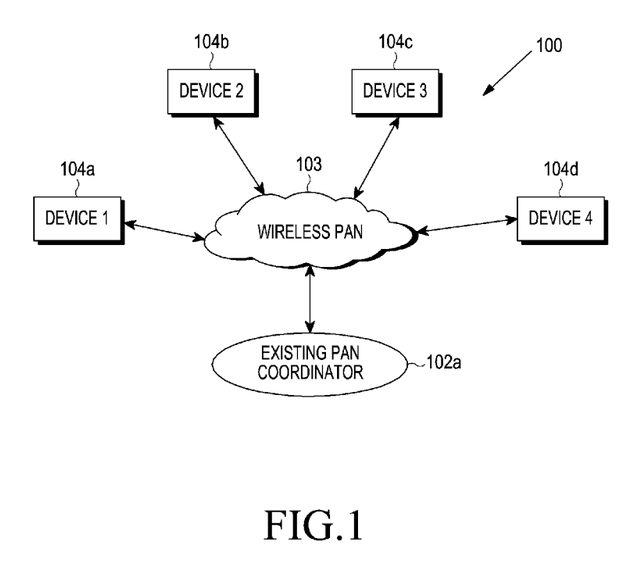
FIG. 1 illustrates a system diagram where at least one device connected to a Personal Area Network (PAN) coordinator according to an embodiment of the present disclosure.

FIG. 1 illustrates a system diagram where at least one device connected to a Personal Area Network (PAN) coordinator according to an embodiment of the present disclosure.

Referring to FIG. 1, a system 100 includes a first device 104a, a second device 104b, a third device 104c, and a fourth device 104d, and a first PAN coordinator 102a. The devices 104a, 104b, 104c, and 104d are connected to the first PAN coordinator 102a through a Wireless Personal Area Network (WPAN) 103 according to an embodiment of the present disclosure. The system 100 may be applicable in number of real time situations. For example, the at least one device 104a, 104b, 104c, and 104d may be sensory devices attached to a body of the patient in a hospital to monitor at least one physical parameter. The PAN coordinator 102a may be managing and coordinating communication of the at least one device 104a, 104b, 104c, and 104d. Further, in another WPAN 103, another PAN coordinator may be present to assist in coordinating the communication of the devices 104a, 104b, 104c, and 104d when they are out of range of the first PAN coordinator 102a.

Figure 2:
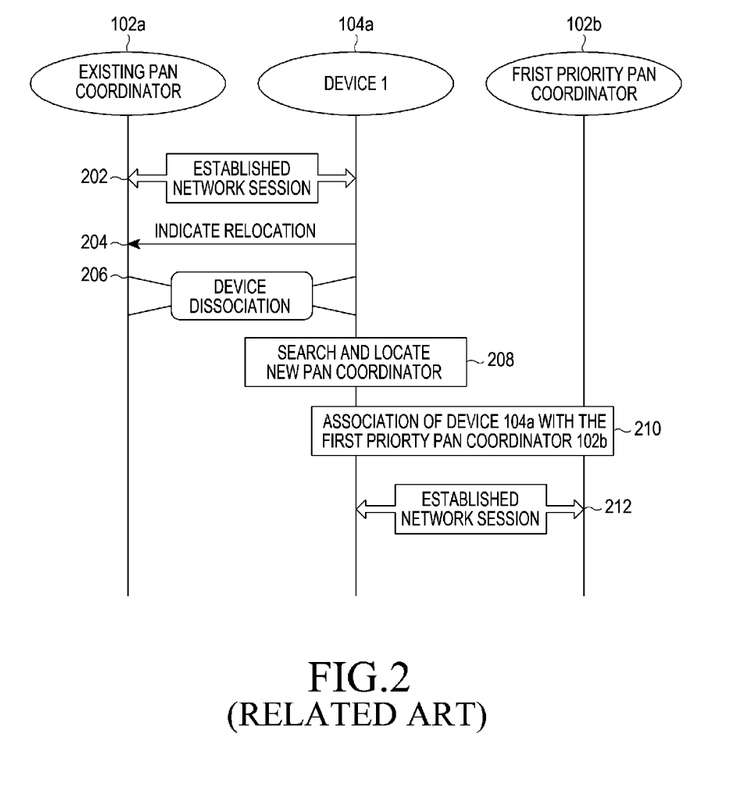
FIG. 2 is a flow diagram of switching PAN coordinators according to the related art.

FIG. 2 is a flow diagram of switching PAN coordinators according to the related art.

Referring to FIG. 2, it shall be noted operations occurs between the first PAN coordinator 102a, the first device 104a and a first priority PAN coordinator 102b. The first priority PAN coordinator 102b may be a candidate PAN coordinator 102b that may connect with at least one device within the network and coordinate the communication.

The first PAN coordinator 102a and the first device 104a are assumed to be in an established network session. The network session is referred in operation 202 of the flow diagram. In operation 204, the device 104a indicates the movement to a new location to the first PAN coordinator 102a. In an alternative embodiment, the first PAN coordinator 102a may determine that location of the first device 104a is out of network zone. There may be many reasons for change in location of the first device 104a. For example, if the first device 104a is attached to body of the patient, when the patient moves, the first device 104a moves along with the patient. In operation 206, the network session between the first PAN coordinator 102a and the first device 104a is turned off due to dissociation. In the present example, the dissociation occurred because of the relocation of the first device 104a.

In operation 208, the first device 104a may continually search and locate new PAN coordinators within the network range. The searching and locating of the new PAN coordinators within a network zone is a power consuming activity for the device 104a. For example, when the device 104a locates the first priority PAN coordinator 102b as the new coordinator, in operation 210, the first priority PAN coordinator 102b and the device 104a forms an association. Thereafter, in operation 212 a new network session is established between the second PAN coordinator 102b and the first device 104a. Further, there may be other number of operations involved in re-establishing the network session.

Figure 3:
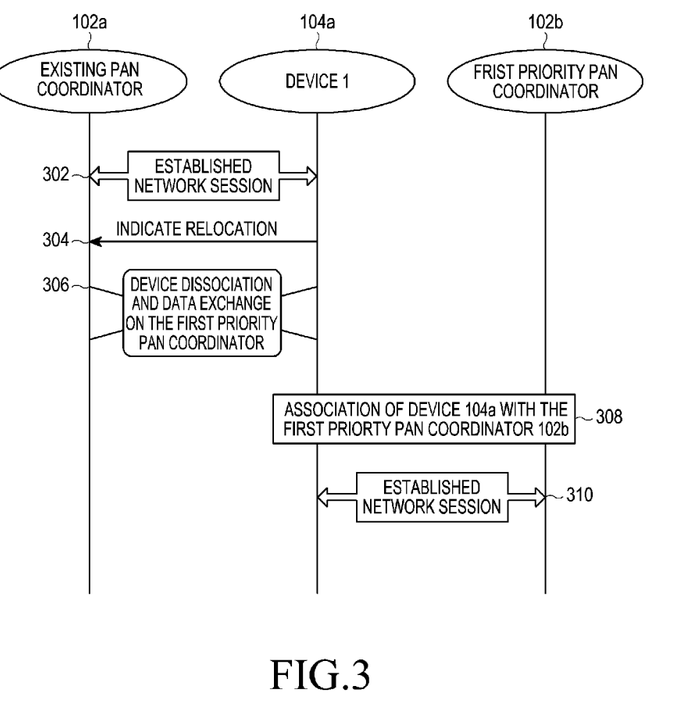
FIG. 3 is flow diagram for switching PAN coordinators according to an embodiment of the present disclosure.

FIG. 3 is flow diagram for switching PAN coordinators according to an embodiment of the present disclosure.

Referring to FIG. 3, according to the present embodiment a scheme of events occurring in the system to perform switching of PAN coordinators is provided. In operation 302, a network session is established between the existing PAN coordinator and the device 104a. In operation 304, the device 104a indicates the first PAN coordinator 102a about relocation which may take the first device 104a out of network zone. On receiving the indication from the device 104a, in operation 306, the PAN coordinator 102a transmits the information of the first priority PAN coordinator 102b for facilitating switching of the PAN coordinator from the first PAN coordinator 102a to the first priority PAN coordinator 102b. In the same operation 306, the PAN coordinator 102a and the device 104a dissociate from each other.

In operation 308, the device 104a and the first priority PAN coordinator 102b form an association and thereafter, in operation 310, a network session is established between the device 104a and the first priority PAN coordinator 102b. During the switching of coordinator, the first coordinator 102a determines whether the first priority PAN coordinator 102b is capable of performing network coordination and communication management of the device 104a and in case, multiple devices are to be connected to the first priority PAN coordinator 102b, then count of the multiple devices is taken into account.

It may be noticed that operation 208 present in FIG. 2 is not performed by the device 104a in the FIG. 3. The operation of searching and locating the suitable PAN coordinator is performed by the first PAN coordinator 102a. Hence, the power consuming activity is negated according to the present embodiment of the disclosure.

Figure 4:
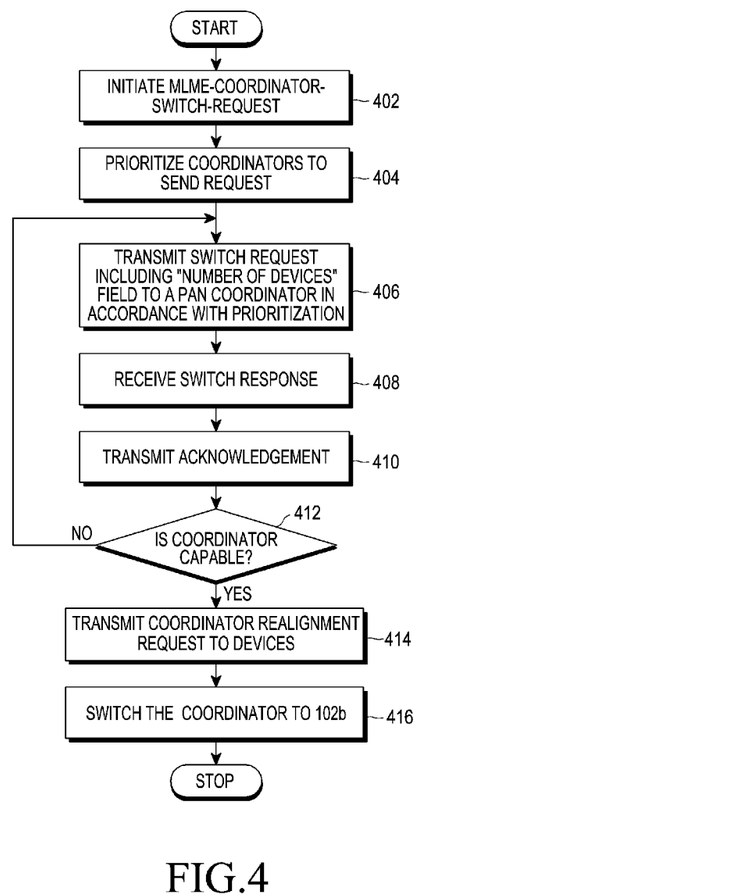
FIG. 4 is a flow chart illustrating switching PAN coordinators according to an embodiment of the present disclosure.

FIG. 4 is a flow chart illustrating switching PAN coordinators according to an embodiment of the present disclosure.

Referring to FIG. 4, a method 400 includes a plurality of operations to perform switching of PAN coordinators. In the operation 402, a Mac Layer Management Entity (MLME) coordinator switch request is initiated at the first PAN coordinator 102a. The request is intended for switching at least one device connected to an existing PAN coordinator to a new PAN coordinator. The initiation may happen between frame transfers between a Media Access Control (MAC) layer of the PAN coordinator 102a (the existing PAN coordinator) and a first network layer. The first network layer may be contributing to any device connected to the PAN coordinator 102a. In operation 404, the PAN coordinator 102a may configure a priority table within to determine potential new PAN coordinators to perform the switch over based on certain criteria. For example, the priority table may include list of PAN coordinators that are candidates for switching in the future, their address and information.

In operation 406, the first PAN coordinator 102a transmits a switch request including "count of devices" field to the first priority PAN coordinator 102b (the new PAN coordinator). The count of devices may refer to the number of devices that are connected to the first PAN coordinator 102a and are intended to be switched to the first priority PAN coordinator 102b. The count of devices is a requirement for the second PAN coordinator 102b for establishing capability. This operation may ensure the first PAN coordinator 102a to prove the capability of replacing the coordination and management activities by the first priority PAN coordinator 102b successfully.

In operation 408, the first priority PAN coordinator 102b provides or transmits a response for the request raised in the operation 406, the response is received at the first PAN coordinator 102a. For example, in at least one embodiment, since the communication between the PAN coordinators and the devices connected occur in the MAC layer of the network, the data is shared in the form of frames in accordance with the protocols of Wireless PAN. For example, the response frame from the first priority PAN coordinator 102b includes 'switch status' as one of the fields denoting status of switching to the first PAN coordinator 102a. In operation 410, an acknowledgement frame is transmitted by the first PAN coordinator 102a to the first priority PAN coordinator 102b. Further, the acknowledgement frame shall be provided by the first PAN coordinator 102a within a threshold time.

On receiving the response from the first priority PAN coordinator 102b, the first PAN coordinator 102a, in operation 412, determines whether the first priority PAN coordinator 102b is capable of coordinating and managing the communication of the devices with the count or number of devices, as transmitted in the request. If yes, in operation 414, the first PAN coordinator 102a transmits a coordinator realignment request frame to the first priority PAN coordinator 102b. If no, in operation 412, the first PAN coordinator 102a transmits a switch request frame to a second priority PAN coordinator in accordance with the priority table and repeats operations 406, 408, 410, and 412 until it finds the capable PAN coordinator for coordinating and managing the communication of the devices with the count or number of devices transmitted in the request. Thereafter, the first priority PAN coordinator 102b and the device 104b establish a realigned network session. As denoted in operation 416, the method concludes with completion of the switching the PAN coordinator.

Figure 5A:
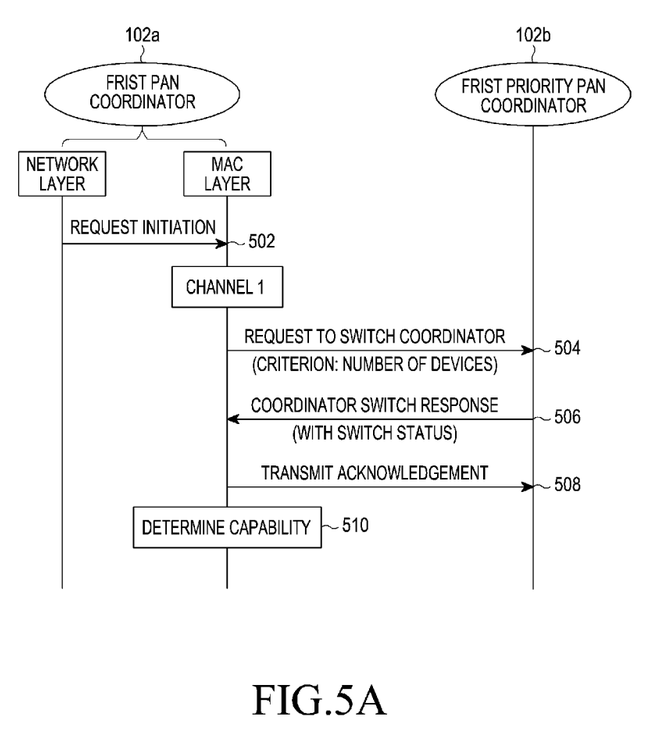
FIG. 5A is a flow diagram illustrating a system to switch PAN coordinators according to an embodiment of the present disclosure.

FIG. 5A is a flow diagram illustrating a system to switch PAN coordinators according to an embodiment of the present disclosure.

Referring to FIG. 5A, in operation 502, a request for switching at least one device present in a network session with the first PAN coordinator 102a is initiated. The request includes a count of the at least one device. The request is initiated by transfer of frames between the network layer and the MAC layer of the first PAN coordinator 102a. The first PAN coordinator 102a may prioritize the PAN coordinators that present in the network in vicinity. A priority table is created with list of PAN coordinators that are suitable candidates for the coordinator switching. In operation 504, at channel 1, the first PAN coordinator 102 transmits a request to switch the at least one device connected to it to the first priority PAN coordinator 102b. The request includes a count of number of devices connected to or is in network session with the first PAN coordinator 102a. The first priority PAN coordinator 102b may be present at top of the priority table which includes the list of other suitable PAN coordinators. There may multiple factors involved in prioritizing suitable PAN coordinators. Those factors are known to the person skilled in the art and will not be discussed further.

In operation 506, the first priority PAN coordinator 102b provides a response to the request. The response more importantly, includes a switch status. On receiving the response from the first priority PAN coordinator 102b, the first PAN coordinator 102a transmits an acknowledgement frame at 508, the acknowledgement frame may be sent within a threshold time after receiving the response. The first PAN coordinator 102a determines the capability of the first priority PAN coordinator 102b whether it may handle and coordinator communication of the at least one device, based on the response.

Figure 5B:
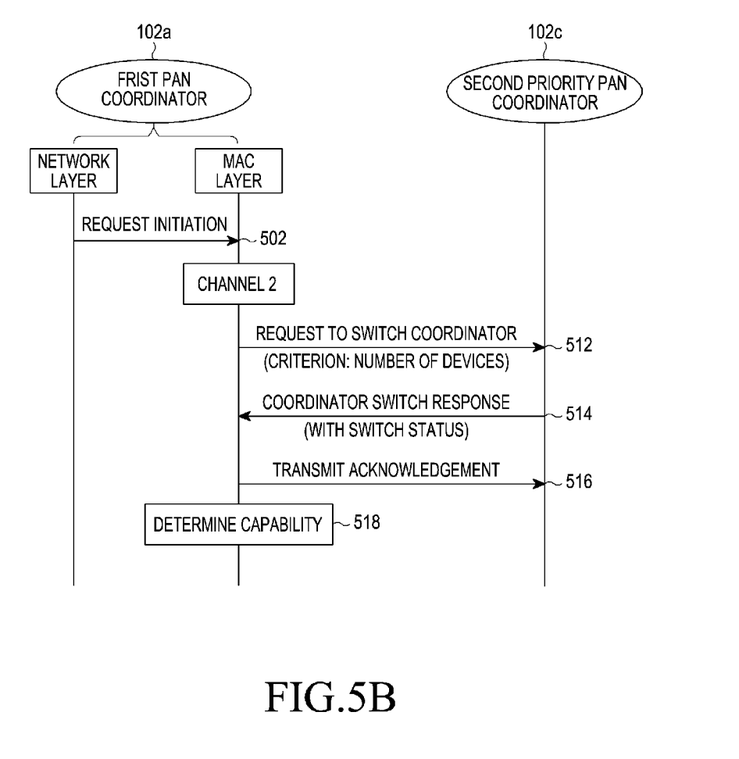
FIG. 5B is a flow diagram illustrating a system to switch PAN coordinators according to another embodiment of the present disclosure.

FIG. 5B is a flow diagram illustrating a system to switch PAN coordinators according to another embodiment of the present disclosure.

Referring to FIG. 5B, if the first PAN coordinator 102a determines that the first priority PAN coordinator 102b is not capable, in operation 512, transmits the request for switching to a second priority PAN coordinator 102c. While transmitting, the first PAN coordinator 102a may select 'Channel 2', another channel for communicating with the second priority PAN coordinator 102c. Operations 512 (request for switching), 514 (reception of coordinator switch response), 516 (transmission of acknowledgement), and 518 (determination of capability of the second priority PAN coordinator 102c) are similar to the operations 504, 506, 508, and 510. Hence, explanation to the mentioned operations is forfeited.

Figure 5C:
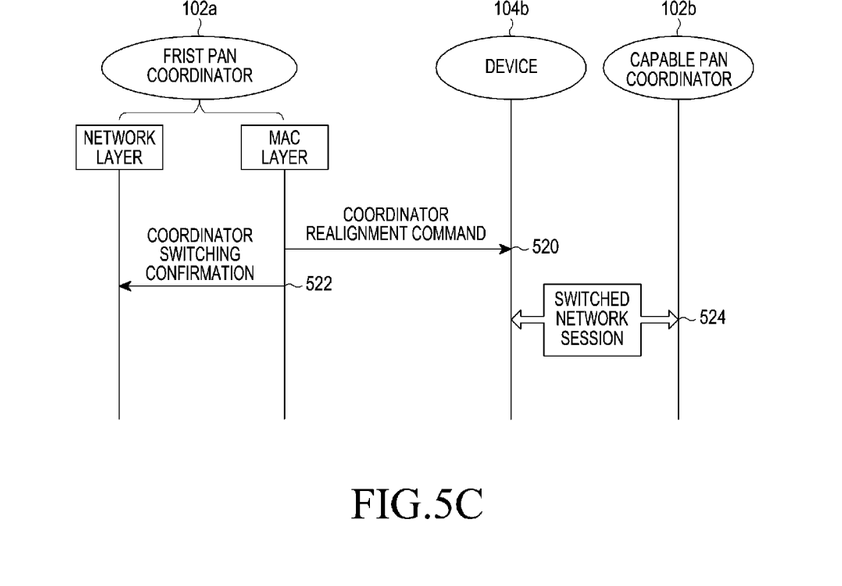
FIG. 5C is a flow diagram illustrating a system to switch PAN coordinators according to another embodiment of the present disclosure.

FIG. 5C is a flow diagram illustrating a system to switch PAN coordinators according to another embodiment of the present disclosure.

Referring to FIG. 5C, the first PAN coordinator 102a has determined that the first priority PAN coordinator 102b is capable for handling and coordinating communication of the at least one device connected to the first PAN coordinator 102a.

In operation 520, a coordinator realignment command frame is transmitted by the first PAN coordinator 102a to the device 104b. Thereafter, the MAC layer of the first PAN coordinator 102a transmits a confirmation of switching of coordinator to the network layer. In operation 524, the device 104b and a capable PAN coordinator establish a switched network session with each other. For example, if the first priority PAN coordinator 102b is determined capable of coordinating and managing communication of the number or count of devices connected to the first PAN coordinator 102a, then the capable PAN coordinator according to the present embodiment shall be the first priority PAN coordinator 102b. For another example, if the first priority PAN coordinator 102b is determined to be incapable of supporting the number or count of devices connected to the first PAN coordinator 102a, then the capable PAN coordinator according to the present embodiment shall be the second priority PAN coordinator (not illustrated).

Figure 6:
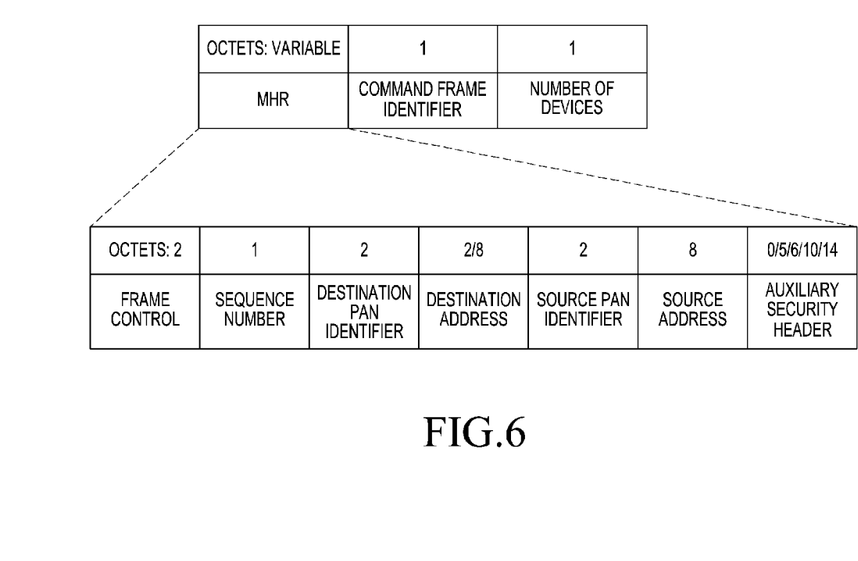
FIG. 6 illustrates a structure of coordinator switch response frame according to an embodiment of the present disclosure.

FIG. 6 illustrates a structure of a coordinator-switch-request frame according to an embodiment of the present disclosure.

Referring to FIG. 6, a coordinator-switch-request frame includes primarily a Message Header (MHR), a command frame identifier, and 'number of devices'. MHR field of Coordinator Switch Request frame is included in a broadcast transmission from a PAN Coordinator in the Personal Area Network.

In an embodiment, a 'Destination Addressing Mode' field shall be included in the request to indicate short addressing, and 'Source Addressing Mode' shall be included in the request to indicate extended addressing, when coordinator switch request is broadcasted in a selected channel. Further, during the transmission of request, A 'Destination PAN Identifier' field be included which shall contain the PAN identifier that is broadcasted and a 'Destination Address Field' be included which shall contain the broadcast short address.

In an embodiment, a 'Source PAN Identifier' shall contain the value of MAC identifier of the PAN coordinator that imitates the request. In the same embodiment, 'Source Address' contains the value of 'macExtendedAddress' of the PAN coordinator that intends to switch.

In one of the various embodiments, the coordinator switch request command may be unicasted to a new PAN coordinator. In such effectuation, the request includes the destination addressing field which is set to include an extended addressing. Further, the destination PAN identifier field includes 'macPANID' of the new PAN coordinator and the destination address field includes the 'macExtendedAddress' of the new PAN coordinator. Further, in an expansive embodiment, the 'source PAN identifier field' includes the value of 'macPANID' of the existing PAN coordinator and the 'source address field' contains the value of 'macExtendedAddress' of the new PAN coordinator that intends to switch.

Figure 7:
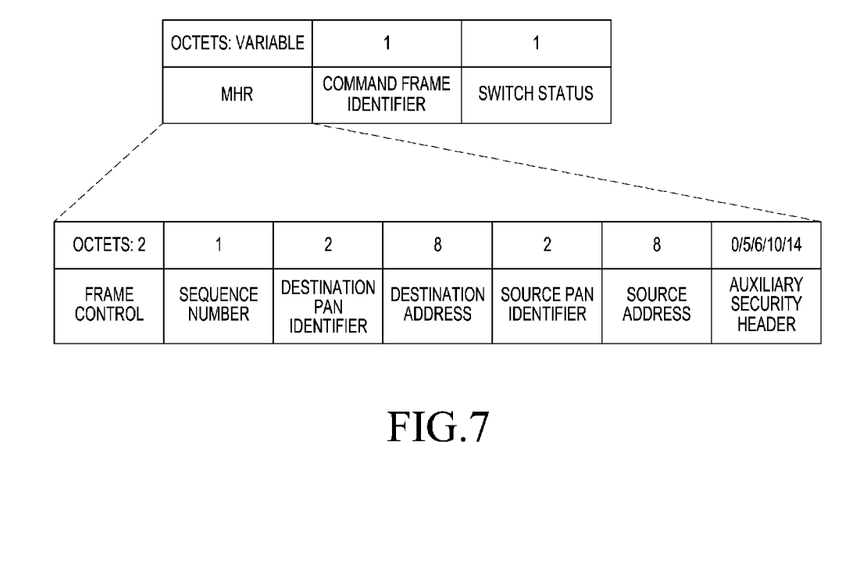
FIG. 7 illustrates a structure of coordinator switch response frame according to an embodiment of the present disclosure.

FIG. 7 illustrates a structure of a coordinator switch response frame according to an embodiment of the present disclosure.

Referring to FIG. 7, the present embodiment, the coordinator switch response frame transmitted by a new PAN coordinator intending to switch includes MHR, a command frame identifier, and a 'switch status'. For example, the command frame identifier value of a command frame identifier may be 0xA0. In an embodiment, the 'switch status' may refer to when the new PAN coordinator responds to the unicast coordinator switch request from the existing PAN coordinator with the field of status set to yes, it indicates that it has confirmed its status as the new PAN coordinator. Further, description of fields of MHR is explained in the description of FIG. 6.

Figure 8:
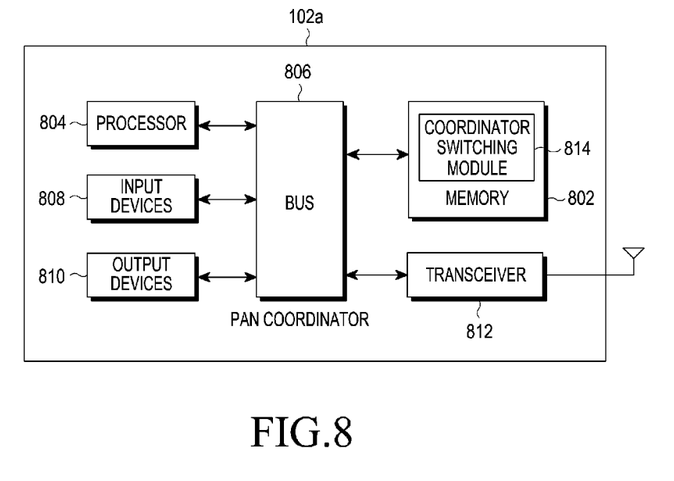
FIG. 8 is a block diagram of a PAN coordinator according to an embodiment of the present disclosure.

FIG. 8 is a block diagram of the first PAN coordinator according to an embodiment of the present disclosure.

Referring to FIG. 8, a first PAN coordinator 102a includes a memory 802, a processor 804, a bus 806, input devices 808, output devices 810, and a transceiver 812, but is not limited thereto. The memory 802 includes a coordinator switching module 814 configured to perform switching of PAN coordinators in the network. In an embodiment, the coordinator switching module 814 includes at least one program and resides in the memory 802. The at least one program is executed with the help of processor 804. The coordinator switching module 814 is configured for initiating a request for switching the at least one device present in a network session to a first priority PAN coordinator, the request comprising a count of the at least one device, transmitting the request comprising a requirement for supporting the at least one device of that count, the request is transmitted to the first priority PAN coordinator, determining whether the first priority PAN coordinator is capable of supporting the at least one device, and if yes, switching the network session of the at least one device with the first priority PAN coordinator to facilitate establishment of the network session with the first priority PAN coordinator. Further, the coordinator switching module is configured to perform at least one operation as illustrated in FIGS. 4, 5A, 5B, and 5C at the end of the first PAN coordinator 102a.

Furthermore, the memory 800 may be volatile memory and non-volatile memory. A variety of computer-readable storage media may be stored in and accessed from the memory elements. Memory elements may include any suitable memory device(s) for storing data and machine-readable instructions, such as read only memory, random access memory, erasable programmable read only memory, electrically erasable programmable read only memory, hard drive, removable media drive for handling memory cards, Memory Sticks™, and the like.

The processor 804, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 804 may also include embedded controllers, such as generic or programmable logic devices or arrays, application specific integrated circuits, single-chip computers, smart cards, and the like. The transceiver 812 is for signal reception and transmission with the network. It is provided as an example that the transceiver 812 is present as a single unit. However, the transceiver 812 may be present as a separated unit with receiver and transmitter.

Figure 9:
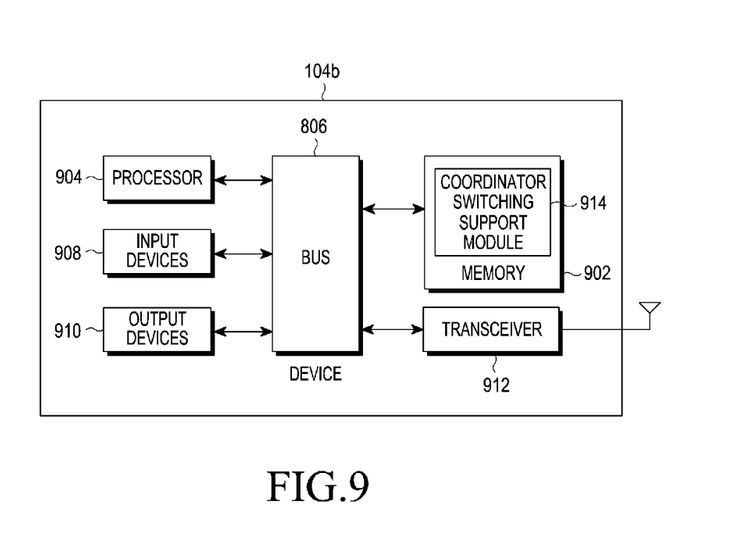
FIG. 9 is a block diagram of one of the at least one device according to an embodiment of the present disclosure.

FIG. 9 is a block diagram of one of the at least one device according to an embodiment of the present disclosure.

Referring to FIG. 9, a second device 104b includes a memory 902, a processor 904, a bus 906, input devices 908, output devices 910, and a transceiver 912, but is not limited thereto. The memory 902 includes a coordinator switching support module 914. The coordinator switching support module 914 may be configured with at least one program to support switching of PAN coordinators in the network. In an embodiment, the coordinator switching support module 914 is capable of performing at least one operation occurring at the end of the second device 104b in the FIGS. 4, 5A, 5B, and 5C. Other components of the second device 104b are known to the persons skilled in the art and will not be explained further. Various embodiments of the present subject matter may be implemented in conjunction with modules, including functions, procedures, data structures, and application programs, for performing tasks, or defining abstract data types or low-level hardware contexts. Machine-readable instructions stored on any of the above-mentioned storage media may be executable by a processor.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A method for switching a coordinator in a personal area network including at least one coordinator and at least one device, the method comprising:
  transmitting, by a coordinator, identification information of a new coordinator determined based on a location of the at least one device, to a device associated with the coordinator; and
  releasing, by the coordinator, an association between the coordinator and the device.

2. The method as recited in claim 1, further comprising:
  transmitting a request for switching the at least one device to the new coordinator;
  determining whether the new coordinator is capable of supporting the at least one device; and
  switching when the new coordinator is capable of supporting the at least one device, a network session of the at least one device with the new coordinator to facilitate establishment of the network session with the new coordinator.

3. The method as recited in claim 2, wherein the determining of whether the new coordinator is capable of supporting the device comprises:
  transmitting, when the new coordinator is not capable of supporting the at least one device, the request to a next priority coordinator determined based on a priority table with the request including a requirement for supporting the at least one device of that count.

4. The method as recited in claim 1, further comprising:
  transmitting an acknowledgement on receiving a response from the new coordinator,
  wherein the response is received within a threshold time.

5. An apparatus for switching a coordinator in a personal area network including at least one coordinator and at least one device, the apparatus comprising:
  a transceiver configured to transmit identification information of a new coordinator determined based on a location of the at least one device to a device associated with the coordinator; and
  a processor configured to release an association between the coordinator and the device.

6. The apparatus of claim 5,
  wherein the transceiver is configured to transmit a request for switching the device to the new coordinator, and
  wherein the processor is further configured to:
    determine whether the new coordinator is capable of supporting the at least one device, and
    switch, when the new coordinator is capable of supporting the at least one device, a network session of the at least one device with the new coordinator to facilitate establishment of the network session with the new coordinator.

7. The apparatus of claim 5, wherein the transceiver is configured to:
  transmit an acknowledgement on receiving the response from the new coordinator, wherein the response is received within a threshold time.

8. The apparatus of claim 5, wherein the transceiver is further configured to:
  determine whether the new coordinator is capable of supporting the at least one device, and
  transmit, when the new coordinator is not capable of supporting the at least one device, the request to a next priority coordinator determined based on the priority table with the request including a requirement for supporting the at least one device of that count.

9. A method for switching a coordinator in a personal area network including at least one coordinator and the at least one device, the method comprising:
  receiving identification information of a new coordinator determined based on a location of a device from a coordinator having an association with the device; and
  releasing an association between the coordinator and the device.

10. The method as recited in claim 9, wherein when the new coordinator is capable of supporting the at least one device, a network session of the at least one device with the new coordinator to facilitate establishment of the network session with the new coordinator is switched.

11. The method as recited in claim 9, wherein when the new coordinator is not capable of supporting the at least one device, a request for switching the at least one device is transmitted to a next coordinator determined based on a priority table.

12. A device for switching a coordinator in a personal area network including at least one coordinator and the at least one device, the device comprising:
  a transceiver configured to receive identification information of a new coordinator determined based on a location of the device from a coordinator having an association with the device; and
  a controller configured to release an association between the coordinator and the device.

13. The device as recited in claim 12, wherein when the new coordinator is capable of supporting the at least one device, a network session of the at least one device with the new coordinator to facilitate establishment of the network session with the new coordinator is switched.

14. The device as recited in claim 12, wherein when the new coordinator is not capable of supporting the at least one device, a request for switching the at least one device is transmitted to a next coordinator determined based on a priority table.

* * * * *